(12) United States Patent
Hembery

(10) Patent No.: US 6,267,483 B1
(45) Date of Patent: Jul. 31, 2001

(54) LOW TEMPERATURE HORTICULTURAL LIGHT APPARATUS

(76) Inventor: Daniel Hembery, 273 Longborough Road, West Bridgeford, Nottingham (GB)

( * ) Notice: Subject to any disclaimer, the term of this patent is extended or adjusted under 35 U.S.C. 154(b) by 0 days.

(21) Appl. No.: 09/325,222

(22) Filed: Jun. 3, 1999

(30) Foreign Application Priority Data

Jun. 3, 1998 (GB) .................................................. 9811797

(51) Int. Cl.$^7$ ...................................................... F21S 6/00
(52) U.S. Cl. ............................ 362/122; 362/1; 362/263; 362/264; 362/373
(58) Field of Search ..................................... 362/268, 122, 362/263, 264, 373, 1, 223, 219

(56) References Cited

U.S. PATENT DOCUMENTS

| | | | |
|---|---|---|---|
| 3,825,741 | 7/1974 | Morton et al. | 240/41 R |
| 4,078,169 | 3/1978 | Armstrong | 362/122 |
| 4,321,659 | 3/1982 | Weheler | 362/293 |
| 4,344,112 | * 8/1982 | Brown | 362/96 |
| 4,546,420 | 10/1985 | Wheeler et al. | 362/268 |
| 4,600,973 | 7/1986 | Mori | 362/32 |
| 4,609,974 | 9/1986 | Mori | 362/32 |
| 5,025,356 | 6/1991 | Gawad . | |
| 5,065,294 | 11/1991 | Poot, Jr. | 362/346 |
| 5,436,815 | * 7/1995 | Grooms et al. | 362/216 |
| 5,765,939 | 6/1998 | Tanner, Jr. . | |
| 5,765,941 | * 6/1998 | Vest | 362/260 |
| 5,964,518 | * 10/1999 | Shen | 362/255 |

* cited by examiner

*Primary Examiner*—Sandra O'Shea
*Assistant Examiner*—John Anthony Ward
(74) *Attorney, Agent, or Firm*—Knechtel, Demeur & Samlan

(57) ABSTRACT

A horticultural light apparatus that reduces heat transmitted to plants that are being illuminated is provided. The Inventive Device includes a hollow, transparent, cylindrical tube, preferably made of glass. The tube is open at both ends and adapted to receive spigot members, the spigot members also being open ended. A support bracket to mount a lightbulb is affixed to at least one of the spigots. A reflector is also installed on the interior of the tube. In use, a lightbulb is inserted into the tube and secured by the spigots. Because of the open ends, air can flow through the tube, thus eliminating over-heating of the lightbulb. The glass absorbs much of the radiant heat generated by the lightbulb while emitting substantially all of the light generated by the lightbulb. The reflector directs the light in a generally downward direction. Means for suspending the Device are also included.

12 Claims, 1 Drawing Sheet

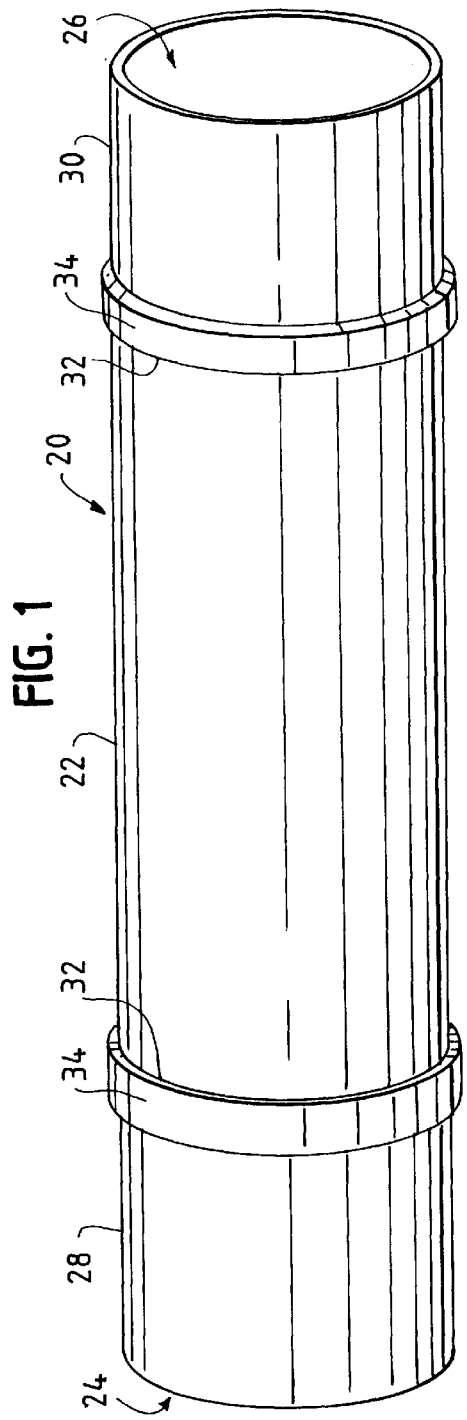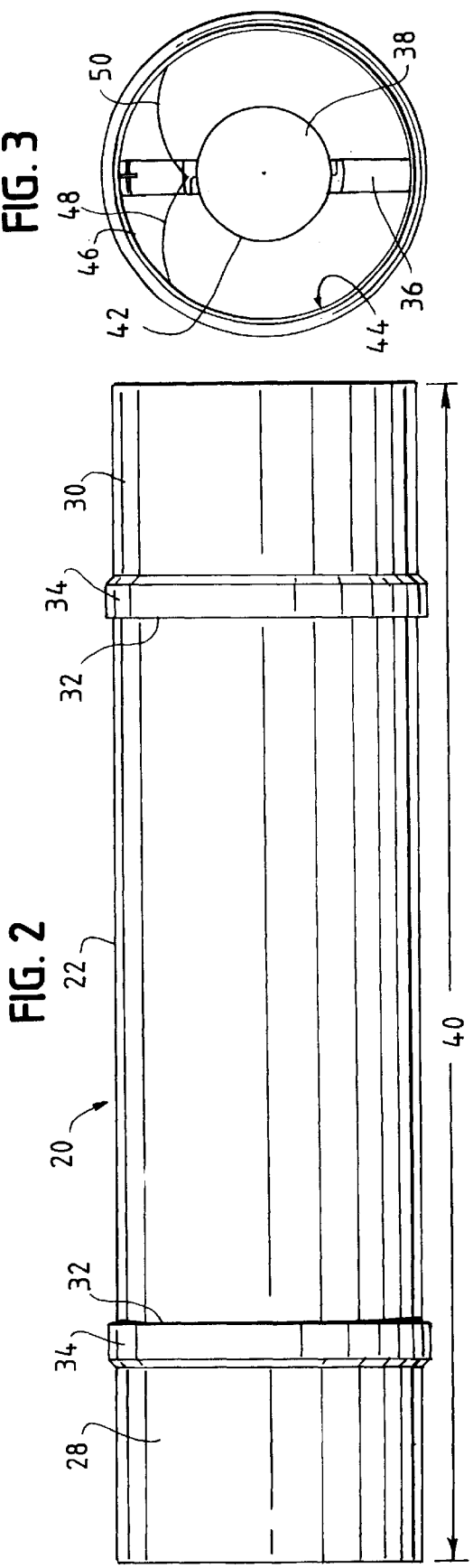

LOW TEMPERATURE HORTICULTURAL LIGHT APPARATUS

PRIORITY OF RELATED FOREIGN PATENT APPLICATION

This patent application claims the benefit of United Kingdom Patent Application, Ser. No. 9811797.1 entitled "Horticultural Lights", filed on Jun. 3, 1998.

I. FIELD OF INVENTION

The present invention relates to light fixtures used in horticultural settings and more particularly, to a horticultural light fixture that promotes plant growth while simultaneously keeping the heat associated with the prior art to a minimum.

II. BACKGROUND OF THE INVENTION AND PRIOR ART

Lights are used in the horticultural field for a variety of purposes. For example, they are used to force seed growth during in climate months for later outdoor planting; in green houses to grow and maintain plants indoors, and, for certain agricultural crops that are grown indoors, such as mushrooms.

Lighting systems used to promote plant growth come in a variety of shapes, sizes, and types. Until the present invention, horticultural lighting systems have suffered from the same shortcoming: while providing adequate light for plant growth, they generate significant heat. Depending on the distance the light is mounted from the plant, the heat reaching the plant may exceed 100° F. Heat may be acceptable for some plants but others are effected negatively by the heat generated by the lights. Deleterious effects such as delicate new growth leaf burning and excessive soil drying can result. These effects, in turn, lead to unnecessary plant loss, thereby decreasing harvest potential and increasing costs.

The prior art is replete with horticultural lights. The devices, however, principally focus on illumination. See, for example, U.S. Pat. Nos. 4,078,169, 4,600,973, 4,609,974, 5,025,356, and 5,065,294. Certain attempts have also been made to reduce or eliminate the problems associated with excessive heat. However, these attempts have been limited to heat reduction for infrared lights and stage lights, and are not suitable for use in horticultural settings.

U.S. Pat. No. 4,321,659 to Wheeler discloses and claims a narrow band, air-cooled light fixture. The device is designed to filter conventional broad spectrum energy so that only desired spectrum regions are transmitted. The device employs a fan and series of filters containing a plurality of holes to emit light to achieve its stated purpose.

A variation of U.S. Pat. No. 4,321,659 is seen in U.S. Pat. No. 4,546,420 to Wheeler, et al, which discloses and claims a similar device having the same stated purposes but instead of filters containing a plurality of holes, this version employs filters having slotted peripheries.

There is a need, therefore, for a horticultural light apparatus that promotes growth through adequate supply of light yet generates little heat, thereby reducing damage to heat sensitive plants. Such a system should be simple to use and not add significantly to the cost of artificial light based horticulture.

II. OBJECTS OF THE INVENTION

It is an object of the present invention to provide a horticultural light apparatus that keeps minimizes heat generation.

It is a further object of the present invention to provide a horticultural light apparatus that includes a hollow transparent cylindrical housing having open ends into which an elongated light source of a diameter smaller than that of the housing is inserted.

It is a further object of the present invention to include a means to secure the light source in the housing.

It is yet a further object of the present invention to provide such a horticultural light apparatus that further includes reflective means contained within the housing.

It is another object of the present invention to provide a low temperature horticultural light apparatus that is economical to produce, easy to use, does not add significantly to the cost of horticultural operations, and aids in increasing horticultural yields, thereby reducing the number of plants lost due to excessive heat.

III. SUMMARY OF THE INVENTION

The above objects are provided for in a low-temperature horticultural light apparatus. The invention comprises a hollow transparent cylindrical housing having open ends into which a light source is inserted. The light source should be cylindrical in shape and of a diameter smaller than that of the housing and further of a diameter to enable sufficient air flow through the housing once the light source is inserted. The light source should further be of a length slightly less than that of the housing.

The ends of the housing are fitted with end caps that secure the light source into place so that the center point of the light source diameter is effectively in line with the center point of the housing diameter. The end caps are further defined by having a hollow center to enable air flow through the housing.

The housing further includes a light reflecting means that reflects light in a downward direction.

IV. BRIEF DESCRIPTION OF THE DRAWINGS

FIG. 1 is a perspective view of the Inventive Device illustrating the hollow cylindrical nature of the open ended housing.

FIG. 2 is a side view of the Inventive Device.

FIG. 3 is an end view of the Inventive Device illustrating the end cap and light source mounting means.

V. DESCRIPTION OF THE PREFERRED EMBODIMENT

Turning to FIG. 1, a perspective view of Inventive Device ("Device") 20 is depicted. Device 20 has a housing comprising a hollow transparent glass tube. Glass is preferred since it has heat absorbing properties and will not melt as would a transparent plastic. For best performance, housing 22 should be scratch resistant. Tempered glass is an excellent material choice.

Housing 22 is open ended, having first end 24 and second end 26. Ends 24, 26 are configured to accept end caps 28, 30. End caps 28, 30 are reversibly affixed to housing ends 24, 26. In the preferred embodiment, end caps 28, 30 are reversibly affixed by means of a pressure fit 32 whereby end cap 34 is of a slightly larger diameter than ends 24, 26. End caps 28, 30 are then slid onto end 24, 26 one end cap on each end. Other means to reversibly affix ends 24, 26 may be employed. Non-limiting examples include a slotted lock system, snap ridge, and thread system; although, the thread system may result in alignment and glass breakage problems. End caps 28, 30 can be made of any material that can hold them fast to housing 22. The inventor has found, however, that stainless steel works well. End caps 28, 30 are also fitted with means for hanging Device 20 (not shown).

Turning to FIG. 3, it can be seen that ends 24, 26 are also open ended, and are provided with support bracket 36. Support bracket 36 permits mounting of lightbulb 38. Lightbulb 38 is positioned so that its longitudinal axis coincides substantially with the horizontal axis 40 (FIG. 2) of housing 22. The diameter of lightbulb 38 should be of a diameter less than that of housing 22 and of small enough diameter to permit free air flow about its outer surface 42 and the inner surface 44 of housing 22. Lightbulb 38 should also be of a length that it fits fully within housing 22. Lightbulb 38 can be, for example, a 400 watt, 600 watt, or 1,000 watt sodium bulb.

Turning back to FIG. 3, it can also be seen that housing inner surface 44 is provided with reflector system 46. Preferably, reflector 46 comprises a twin reflector disposed above lightbulb 38. Reflector 46 is preferably made of stainless steel and the configuration and dispositions of the twin parts 48, 50 are such that the majority of the light emanating from lightbulb 38 is directed downwardly on to the plants to be illuminated. However, and as those skilled in the arts will quickly realize, any conventional reflecting system will work.

In use, at least one spigot is removed from housing 22. Lightbulb 38 is inserted into housing 22. The spigot is replaced with the lightbulb being reversibly attached to support bracket 36. Lightbulb 38 is positioned by supporting bracket 36 so that its diameter center-point approximates that of the housing diameter center-point. Device 20 is then mounted so that it extends generally horizontally above the plants to be illuminated.

The open ends of Device 20 enable free flow of air within housing 22, thus avoiding over-heating of lightbulb 38. The glass of housing 22 absorbs a substantial portion of the radiant heat generated by lightbulb 38, but practically none of the light emitted by lightbulb 38, thus, ensuring that the plants over which Device 20 is suspended are effectively illuminated while enabling "cool" growing conditions to be maintained.

The above description is for illustration purposes only. As those in the arts will understand, there are many alternatives, modifications, and variations of the inventive device that would fall within the spirit of the invention, the scope of which to be determined by the appended claims.

What is claimed:

1. A horticultural light apparatus for reducing heat transmitted to plants comprising:
    a hollow transparent tube, the tube having a first open end and a second open end;
    a first hollow end cap adapted to affix to the first open end of the tube;
    a second hollow end cap adapted to affix to the second open end of the tube, the first end cap and the second end cap further having open ends;
    at least one support bracket for mounting a light source within the tube;
    the first end cap and the second end cap coacting with the tube to form a hollow elongated horticultural light apparatus for positioning horizontally in relation to the plants thereby enabling sufficient light emanating from the light source to the plants for plant growth while regulating the temperature of the elongated horticultural light apparatus by the free flow of air circulating through the hollow elongated horticultural light apparatus for reducing the heat transmitted to the plants.

2. The horticultural light apparatus of claim 1 wherein the tube is made of glass.

3. The horticultural light apparatus of claim 1 further including a reflector mounted within the tube.

4. The horticultural light apparatus of claim 3 wherein the reflector is comprised of two members, each member positioned to deflect the light from the light source in a direction toward the plants.

5. The horticultural light apparatus of claim 1 wherein at least one of the end caps is reversibly affixable to the tube.

6. The horticultural light apparatus of claim 1 further including means to suspend the apparatus.

7. A horticultural light apparatus, comprising:
    a hollow, cylindrical glass tube having a first open end and a second open end,
    two opposed open ended caps, each cap adapted to be affixed to the first open end and the second open end of the glass tube, respectively, the two opposed open ended caps and the glass tube forming an elongated horticultural light apparatus;
    a mounting bracket adapted to mount a lightbulb within the tube such that the center point of the lightbulb diameter is positioned at approximately the diameter center point of the glass tube, the glass tube absorbing a minimum amount of light emanating from the lightbulb thus enabling substantially all of the emanating light from the lightbulb toward the plants to be absorbed by the plants for increasing plant growth;
    the diameter of the tube being of a size sufficient for enabling the free flow of air through the elongated horticultural light apparatus and over the lightbulb thereby reducing the heat generated by the lightbulb from being absorbed by the plants;
    means for reflecting the light from the lightbulb in a direction toward the plants.

8. The horticultural light apparatus of claim 7 wherein at least one spigot is reversibly affixed to the glass tube.

9. The horticultural light apparatus of claim 7 wherein the means for reflecting the light from the lightbulb in a direction toward the plants comprises a reflector mounted within the glass tube.

10. The horticultural light apparatus of claim 9 wherein the reflector is made of stainless steel.

11. The horticultural light apparatus of claim 7 wherein the lightbulb is a sodium bulb that emanates light substantially between 400 watts and 1,000 watts.

12. The horticultural light apparatus of claim 7 wherein the elongated horticultural light apparatus is positioned horizontally in relation to the plants.

* * * * *